COPOLYMERS OF FLUORINATED ETHERS

John G. Abramo and Raymond H. Reinhard, Galveston, Tex., assignors to Monsanto Chemical Company, St. Louis, Mo., a corporation of Delaware No Drawing. Filed Dec. 14, 1956, Ser. No. 628,216

5 Claims. (Cl. 260—85.5)

This invention relates to new polymeric products and, more particularly, to new fluorine-containing polymers produced by homopolymerization of fluorinated ethers and by interpolymerization of such fluorinated ethers with polymerizable vinyl compounds.

It has been found that ethers of the type such as 2-chloro-1,1,2-trifluoroethyl allyl ether may be polymerized to yield useful plastic masses. Furthermore, if these fluorinated ethers are interpolymerized with certain vinyl-type monomers, there are produced various polymers having many interesting properties which can be used among other things to form films and protective coatings.

Accordingly, it is an object of our invention to provide novel polymeric materials. It is a further object of the invention to provide polymers of fluorinated ethers and copolymers of said ethers with vinyl-type monomers. Other objects and advantages of the invention become apparent from the following description.

According to the invention, ethers of the type represented by the general formula $$CH_2=CR-CH_2O-CF_2-CX_2H$$

wherein R is hydrogen or a methyl group and X may be chlorine, fluorine, or hydrogen, are polymerized either alone or conjointly with a polymerizable ethylenically unsaturated compound such as styrene, methyl methacrylate, acrylonitrile, vinyl acetate, and the like.

The new polymers may be prepared according to the usual methods in mass, in solution, in suspension or in emulsion in aqueous or other suitable diluents. The usual peroxide catalysts or initiating agents are used such as benzoyl peroxide, acetyl peroxide, potassium persulfate, sodium persulfate, hydrogen peroxide, etc. "Activating" agents such as sodium bisulphite may be used in conjunction with the usual catalyst. Other sources of activation which may be employed are $\alpha$-rays, X-rays, light, heat, and organic compounds other than peroxides which break down to give free radicals such as azobisisobutyronitrile, hydrazine, etc.

The homopolymers of the fluorinated allyl and methallyl ethers are in general low molecular weight liquid or semi-solid products. When copolymerized with other vinyl monomers, particularly with from 5% to 95% of the vinyl monomer, solid polymers are obtained. The properties of the various copolymers are dependent upon the type of monomer and the amount of it present in the copolymers. Products ranging from semi-solids to solids can be obtained. These are useful as molding powders and fiber and film forming materials.

The monomers are readily prepared by the addition of polyfluoroolefins to the appropriate alcohol in the presence of a base at room temperature and atmospheric pressure.

The following examples are presented to further illustrate the invention but are not to be considered as limiting it in any manner.

Example I 2-chloro-1,1,2-trifluoroethyl allyl ether was prepared by bubbling chlorotrifluoroethylene at room temperature through allyl alcohol in which a catalytic amount of KOH had been dissolved. After absorption of the olefin had ceased, the reaction mixture was washed with water to remove the catalyst, unreacted allyl alcohol, and any dissolved unreacted chlorotrifluoroethylene. The wash water was decanted, the organic material was dried with anhydrous calcium chloride and then was distilled to yield the ether product having a boiling point of 109° C. at 771 mm. of Hg. Approximately 15 g. of the 2-chloro-1,1,2-trifluoroethyl allyl ether and 0.45 g. of benzoyl peroxide was charged to a tube which was then sealed and placed in a constant temperature oil bath maintained at 85° for a period of 25 hours. At the end of this time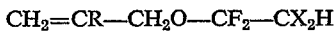, the tube was opened and its contents were discharged into a 25-cc. round-bottomed flask and subjected to heating under vacuum to remove all volatile components boiling below 150° C. at 200 mm. of Hg. The polymeric product recovered was a pale, greenish-yellow viscous liquid at room temperature. This homopolymer was somewhat sticky, extremely resistant to wetting with water, and soluble in a 1:1 mixture of absolute ethanol and carbon tetrachloride.

Example II

Sixty parts by weight of vinyl acetate, 40 parts by weight of 2-chloro-1,1,2-trifluoroethyl allyl ether, and 3 parts by weight of benzoyl peroxide in a sealed tube were heated at 75° C. for 25 hours in a constant temperature oil bath. A semi-solid polymer was produced which is soluble in ethyl acetate.

Example III

A monomer-catalyst mixture consisting of 70 parts by weight of styrene, 30 parts by weight of 2-chloro-1,1,2-trifluoroethyl allyl ether, and 3 parts by weight of benzoyl peroxide was heated in a sealed tube at 75° C. for 25 hours. The semi-solid copolymer was dissolved in ethylbenzene, then precipitated in methanol, and dried overnight at 40° C. in a vacuum oven. The recovered copolymer was a white amorphous powder.

Example IV

Fifty parts by weight of 2-chloro-1,1,2-trifluoroethyl allyl ether and 50 parts by weight of methyl methacrylate were copolymerized by heating them together with 3 parts by weight of benzoyl peroxide as a catalyst in a sealed tube for 25 hours at 75° C. The semi-solid polymer obtained was soluble in ethyl acetate. It was dissolved in the acetate, precipitated in methanol and dried overnight at 40° C. in a vacuum oven to yield a white amorphous powder. The film formed by allowing the ethyl acetate to evaporate from a solution of the polymer in this solvent spread upon a glass plate was clear, transparent and flexible when removed from the plate.

Example V

The copolymer obtained by heating 50 parts by weight of acrylonitrile, 50 parts by weight of 2-chloro-1,1,2-trifluoroethyl allyl ether and 3 parts by weight of benzoyl peroxide in a sealed tube at 75° C. for 25 hours was a light tan amorphous powder. This material swelled in dimethylformamide but did not dissolve in it.

In a manner similar to that described in the examples above, homopolymers of 2-chloro-1,1,2-trifluoroethyl methallyl ether, tetrafluoroethyl allyl ether, 2,2-dichloro-1,1-difluoroethyl methallyl ether, 2-chloro-1,1-difluoroethyl allyl ether, 2,2,-difluoroethyl allyl ether, 1,1,2-trifluoroethyl methallyl ether and the like may also be prepared as well as copolymers of any of these materials

What is claimed is:

1. A copolymer of a mixture consisting of a fluorinated ether having the general formula $$CH_2=CR-CH_2O-CF_2-CX_2H$$

wherein R is chosen from the group consisting of hydrogen and the methyl radical and X is chosen from the group consisting of fluorine, chlorine, and hydrogen and a compound selected from the group consisting of vinyl acetate, styrene, methyl methacrylate, and acrylonitrile.

2. A copolymer of 2-chloro-1,1,2-trifluoroethyl allyl ether with vinyl acetate.

3. A copolymer of 2-chloro-1,1,2-trifluoroethyl allyl ether with styrene.

4. A coplymer of 2-chloro-1,1,2-trifluoroethyl allyl ether with methyl methacrylate.

5. A copolymer of 2-chloro-1,1,2-trifluoroethyl allyl ether with acrylonitrile.

References Cited in the file of this patent

UNITED STATES PATENTS

| | | |
|---|---|---|
| 2,603,628 | Fuchaire et al. | July 15, 1952 |
| 2,617,787 | Tawney | Nov. 11, 1952 |
| 2,631,975 | Lawson | Mar. 17, 1953 |

OTHER REFERENCES

Preparation of Polyfluoro Ethers, article by Barr et al., J. Amer. Chem. Soc., vol. 72, October 1950, pp. 4480–82.